(12) United States Patent
Shimizu et al.

(10) Patent No.: US 7,490,952 B2
(45) Date of Patent: Feb. 17, 2009

(54) ILLUMINATION UNIT AND LIQUID CRYSTAL DISPLAY DEVICE USING THE SAME

(75) Inventors: Makoto Shimizu, Ishikawa-ken (JP);
Toshihiko Ura, Ishikawa-ken (JP);
Yoshinori Yasuda, Ishikawa-ken (JP);
Hiromi Kaneda, Ishikawa-ken (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 51 days.

(21) Appl. No.: 11/463,494

(22) Filed: Aug. 9, 2006

(65) Prior Publication Data

US 2007/0064408 A1 Mar. 22, 2007

(30) Foreign Application Priority Data

Sep. 20, 2005 (JP) ............................... 2005-272554

(51) Int. Cl.
*F21S 4/00* (2006.01)
(52) U.S. Cl. ........................... 362/225; 362/29; 362/294
(58) Field of Classification Search ................... 362/29, 362/30, 225, 260, 294, 297, 346, 627, 632, 362/633, 634, 373
See application file for complete search history.

(56) References Cited

U.S. PATENT DOCUMENTS

| 4,531,180 A | * | 7/1985 | Hernandez | ................... 362/297 |
| 6,580,478 B2 | * | 6/2003 | Kim | ............................ 362/633 |
| 6,853,410 B2 | * | 2/2005 | Matsuda et al. | ............. 362/632 |

FOREIGN PATENT DOCUMENTS

| JP | 2000-56303 | 2/2000 |
| JP | 2003-5157 | 1/2003 |

* cited by examiner

*Primary Examiner*—Y My Quach Lee
(74) *Attorney, Agent, or Firm*—Oblon, Spivak, McClelland, Maier & Neustadt, P.C.

(57) ABSTRACT

Illumination unit UT is used for the illumination of an LCD panel 1 from the rear side of the LCD panel 1. Illumination unit UT is provided with light source 2, rear cover 6 to cover light source 2 and reflective sheet 5 coated on an inner surface of rear cover 6. Concretely, reflective sheet 5 is disposed to have clearance "A" with respect to rear cover 6. Alternatively, reflective sheet 5 is divided into a plurality of pieces, so that clearance "A" is defined between at least one piece 5A of reflective sheet 5 and rear cover 6.

8 Claims, 3 Drawing Sheets

ILLUMINATION UNIT AND LIQUID CRYSTAL DISPLAY DEVICE USING THE SAME

CROSS-REFERENCE OF RELATED APPLICATIONS

This application is based upon and claims the benefit of priority from the prior Japanese Patent Application No. 2005-272554, filed on Sep. 20, 2005, the entire contents of which are incorporated herein by reference.

FIELD OF THE INVENTION

This invention generally relates to an illumination unit and, in particular, to an illumination unit used for a liquid crystal display device and a liquid crystal display device using the illumination unit.

BACKGROUND OF THE INVENTION

Since a liquid crystal display (LCD) device has advantages of light weight, thin thickness and low power consumption, such an LCD device has been widely used for information handling equipment, such as personal computers and word processors, and video equipment, such as television receivers and car navigation systems, as a display device. Many LCD devices applied to those applications include an illumination unit that projects light from a rear side of a display panel to achieve a bright display picture.

Here, an illumination unit is classified into an edge light system or a directly-under-disposed system depending on its disposition of a light source. The edge light system, for example, includes its light source disposed at an edge of a light guide plate provided opposite to a display panel. The directly-under-disposed system, however, includes a plurality of straight-line light sources of fluorescent discharge tubes or the like provided behind a display panel and a diffusing plate provided between the display panel and the light source.

It is easily achievable to make the directly-under-disposed system much brighter than the edge light system. The former is advantageous because a light emitting surface of the former is more uniform in brightness than that of the latter. Recently, larger size LCD devices have been widely used for TV receivers and much brighter LCD devices are required for them. It is essential to adopt a directly-under-disposed type illumination unit for such demands.

Conventionally the structure disclosed in Japanese Patent Publication No. 2003-5157, for instance, is known as a directly-under-disposed type illumination unit. In the LCD device disclosed in Japanese Patent Publication No. 2003-5157, the illumination unit to project light from the rear side of an LCD panel includes a housing, a light source (lamp), a lamp holder to support the light source, a reflective sheet, an optical diffusing plate to efficiently transfer light projected from the light source to the LCD panel, and a rear cover containing the light source, the lamp holder, the reflective sheet and the diffusing plate.

In the structure of such a conventional illumination unit, when an LCD panel size becomes larger, thermal expansion of the reflective sheet due to heat generated from the light source (lamp) results in a critical problem as to display quality. The expansion of the reflective sheet in the illumination unit interferes with the rear cover, so that the reflective sheet is distorted. Portions distorted in the reflective sheet result in uneven reflection of light, i.e., illumination light projected to the LCD panel becomes uneven in distribution. The deterioration of display quality is critical for any LCD panel and must be improved.

SUMMARY OF THE INVENTION

Accordingly, it is an object of the present invention to provide an illumination unit in which distortion of a reflective sheet due to thermal expansion can be solved and which achieves high display quality. It is another object of the present invention to provide an LCD device with higher display quality.

An aspect of the present invention is directed to an illumination unit for projecting light from a rear side of an LCD panel which includes a light source, a rear cover provided to cover the light source and a reflective sheet provided to cover a inner surface of the rear cover, wherein a clearance is provided between the reflective sheet and the rear cover. Another aspect of the present invention is directed to an LCD device which includes an LCD panel provided on a light projection side of the illumination unit.

According to the present invention, since the illumination unit of the present invention is provided with the clearance defined between the reflective sheet and the rear cover, thermal expansion of the sheet is absorbed in the clearance, the reflective sheet does not substantially interfere with the rear cover so that no significant wrinkles are formed on the reflective sheet. Thus, uneven reflection due to wrinkles or distortions of the reflective sheet can be solved.

There are various structures to define a clearance between the reflective sheet and the rear cover. For instance, the reflective sheet is provided with a space with respect to the rear cover. Alternatively, the reflective sheet is divided into a plurality of sheets and at least one of the divided reflective sheets is provided with a clearance with respect to the rear sheet. In any event, distortions or wrinkles are prevented from being formed on the reflective sheet.

Since an illumination unit of the present invention includes a clearance provided between a reflective sheet and a rear cover, even if thermal expansion of the reflective sheet due to heat occurs, the reflective sheet does not interfere with the rear cover, the reflective sheet is not distorted nor cause to have wrinkles, and the illumination unit does not deteriorate in display image quality caused by uneven reflection of the reflective sheet. An LCD device using such an illumination unit irradiates uniform light toward an LCD panel and can achieve high quality image display.

BRIEF DESCRIPTION OF THE DRAWINGS

A more complete appreciation of the present invention and many of its attendant advantages will be readily obtained as the same becomes better understood by reference to the following detailed descriptions when considered in connection with the accompanying drawings, wherein.

DETAILED DESCRIPTION OF THE INVENTION

Figure 1:
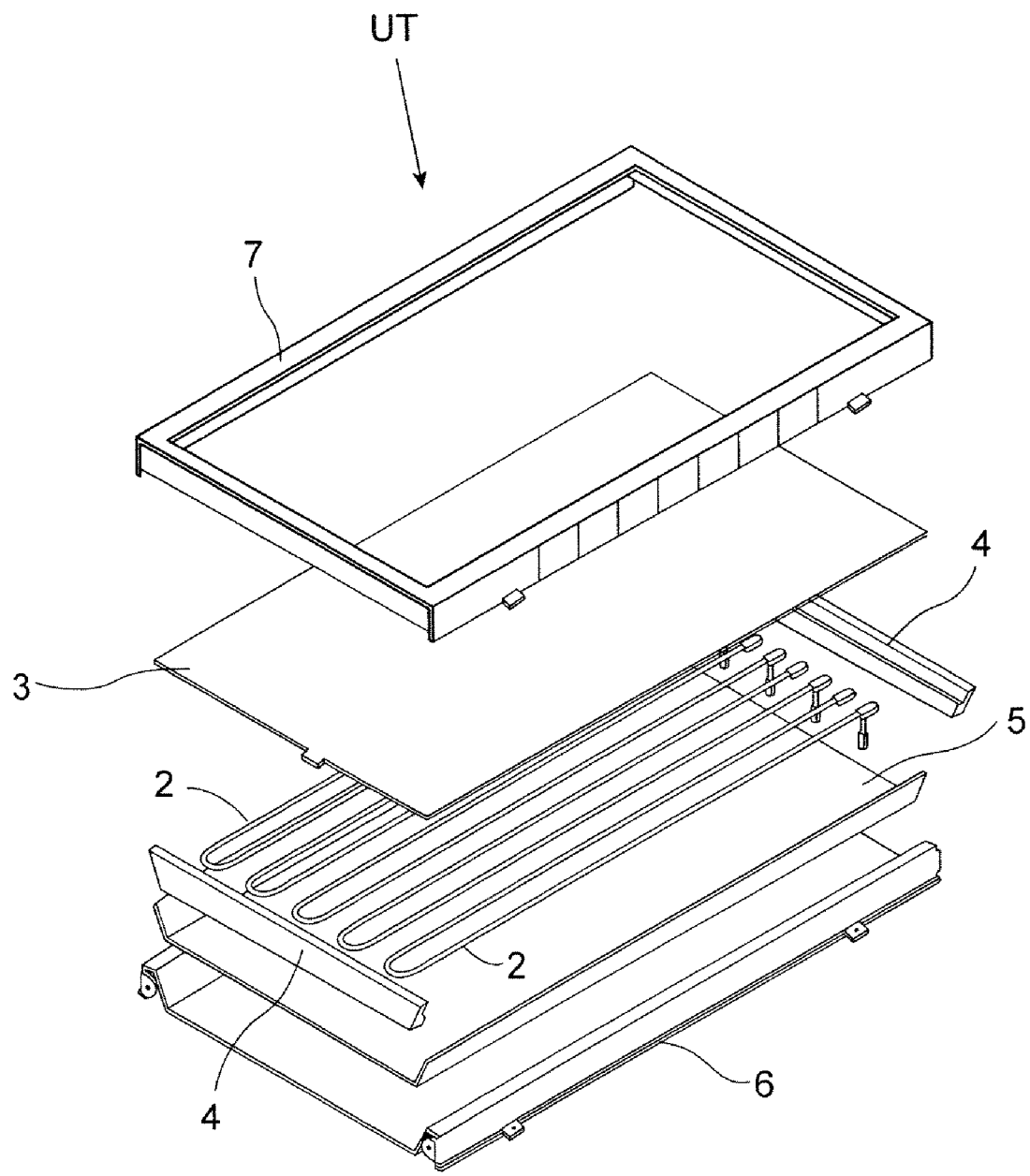
FIG. 1 is a perspective view of disassembled components of an illumination unit in accordance with an embodiment of the present invention.

An illumination unit and an LCD device of the present invention will be described below with reference to the attached drawings. It should be noted that the present invention is not limited to the embodiments but covers their equivalents. Throughout the attached drawings, similar or same reference numerals show similar, equivalent or same components. The drawings, however, are shown schematically for the purpose of explanation so that their components are not necessarily the same in shape or dimension as actual ones. In other words, concrete shapes or dimensions of the components should be considered as described in these specifications, not in view of the ones shown in the drawings. Further, some components shown in the drawings may be different in dimension or ratio from each other.

FIRST EMBODIMENT

An illumination unit of a first embodiment of the present invention is assembled in an LCD device as a rear light source. Structure of the illumination unit is shown in FIG. 1.

Illumination unit UT shown in FIG. 1 includes a plurality of straight-line light sources 2, diffusing plate 3 to diffuse light projected from light source 2, supporting members 4 to support light sources 2 at their both edges, reflective sheet 5 provided behind light sources 2 (on the rear surface side of an LCD panel), rear cover 6 disposed on the rear side of reflective sheet 5 and frame-like housing 7 to surround and support diffusing plate 3, rear cover 6 and the like.

In illumination unit UT, light sources 2 are disposed substantially in parallel with each other with a predetermined lateral interval on the rear side of diffusing plate 3. As light sources 2, straight-tube light sources or ones which are straight, folded at one end and character-U-shaped can be used. Here, folded, character U-shaped and two parallel light irradiating straight-tube lamps are used for light sources 2. Straight-tube lamps can be fluorescent discharge tubes, for example, that are driven to emit light by high frequency electric currents.

Figure 2:
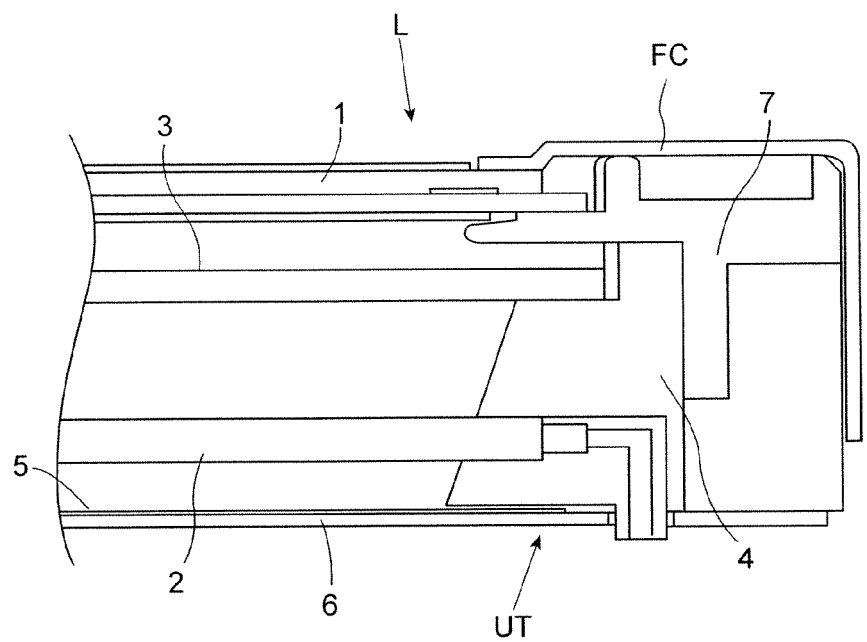
FIG. 2 is a sectional view of portions of an LCD device containing the illumination unit.

Diffusing plate 3 has the property for the diffusion of incident light, so that diffusing plate 3 diffuses light from light sources 2 and uniformly projects such diffused light to LCD panel 1 (see FIG. 2). Supporting members 4 have functions of supporting light sources 2 at both of their edges, further leading the light from light sources 2 to the side of LCD panel 1 and increasing illumination light from the projection surface. Reflective sheet 5 is disposed between light sources 2 and rear cover 6, and has functions of reflecting light emanating from light sources 2 to the rear side, leading the same to LCD panel 1 and increasing illumination light from the projection surface. As reflective sheet 5, a high reflectivity, white resin film can be used. Rear cover 6 has functions of supporting light sources 2 and reflective sheet 5 from the rear side and completing a housing member.

As shown in FIG. 2, on the other hand, housing 7 is provided to surround diffusing plate 3 and rear cover 6 from side and front surfaces. Housing 7 also has a function of maintaining light sources 2 and diffusing plate 3. Housing 7 is made of polycarbonate resin or any suitable substitute.

LCD panel 1 is set on the front surface of illumination unit UT described above. Metal front frame FC is set and fixed to assemble LCD panel 1 and illumination unit UT into LCD device L. Light projected from light sources 2 is transmitted onto LCD panel 1, so that LCD panel 1 displays pictures such as characters, video images or the like.

In LCD device L provided with LCD panel 1 on the light projecting side of illumination unit UT, light projected from light sources 2 is collected directly or through reflective sheet 5 and the like, is led to diffusing plate 3 and is then irradiated through diffusing plate 3 onto LCD panel 1. As a result, pictures such as characters, video images and the like are displayed on LCD panel 1.

In such a way as described above, illumination unit UT is assembled into LCD device L. Next, the structure of illumination unit UT will be described in detail below.

As described above, illumination unit UT includes light sources 2, supporting member 4 to support light sources 2, reflective sheet 5 provided on the rear side of light sources 2, and rear cover 6 provided on the rear side of reflective sheet 5. Such a structure of illumination unit UT is shown in FIG. 3.

Reflective sheet 5 is made of a high reflectivity, white resin film or any suitable substitutes, as mentioned above, and is usually formed to cover the inner surface of rear cover 6 entirely. When reflective sheet 5 is set to cover the entire inner surface of rear cover 6, the thermal expansion of reflective sheet 5 due to heat from light sources 2 causes the interference of reflective sheet 5 with rear cover 6 so that reflective sheet 5 is distorted in proportion to the thermal expansion. Such distortion of reflective sheet 5 makes curves or wrinkles of reflective sheet 5 and becomes a cause of uneven reflection.

Figure 3:
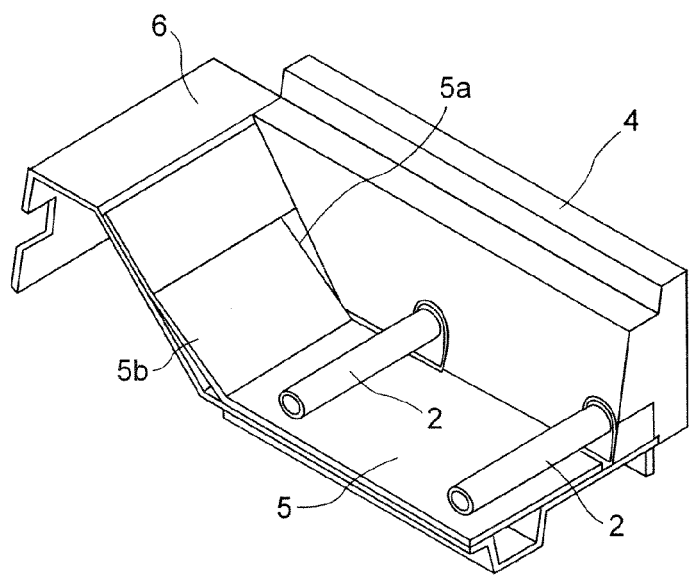
FIG. 3 is a schematic perspective view of portions of the illumination unit.
Figure 4:
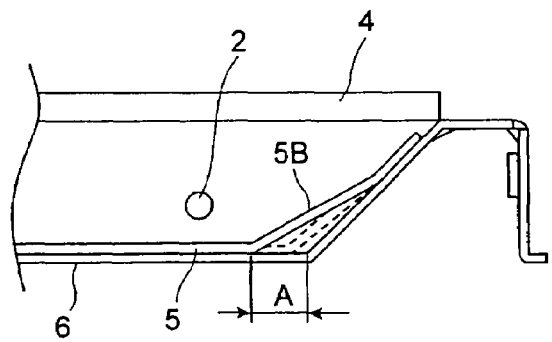
FIG. 4 is a schematic sectional view of the portions of the illumination unit shown in FIG. 3.

According to the first embodiment of the present invention, clearance "A" and a space are defined between reflective sheet 5 and rear cover 6 as shown in FIGS. 3 and 4 for the interference of reflective sheet 5 with rear cover 6 so as not to cause curves or wrinkles of reflective sheet 5. More concretely, as shown in FIG. 3, the edge portion called retreating portion 5a of reflective sheet 5 is cut out and set back from a corner portion where supporting member 4 is in contact with rear cover 6. The provision of retreating (cut-out) portion 5a allows reflective sheet 5 to escape from the corner portion. As shown in FIG. 4, a size of reflective sheet 5 is formed slightly smaller than that of the inner surface of rear cover 6 for reflective sheet portion 5b rising up obliquely along rear cover 6 not to closely contact with rear cover 6 to define such a small space and clearance "A" as set forth above.

Since this structure includes clearance "A" provided between reflective sheet 5 and rear cover 6, even when reflective sheet 5 expands with heat, such expansion of reflective sheet 5 is absorbed in clearance "A" and reflective sheet 5 no longer substantially interferes with rear cover 6. In short, even when reflective sheet 5 expands with heat to the extent of dotted lines shown in FIG. 4, reflective sheet 5 does not interfere with rear cover 6 or distortions of reflective sheet 5, if any, do not result in curves or wrinkles.

Further, since a part of the inner surface of rear cover 6 is exposed depending on the expansion of retreating portion 5a formed on reflective sheet 5, light reflection on such a part of the inner surface of rear cover 6 contributes light projection. Usually, the reflectivity of rear cover 6 is not expected so much as that of reflective sheet 5. As a result, it is possible for a problem to raise due to a relatively lower reflectivity of the part of the inner surface. Thus, it is effective to coat at least a portion of the inner surface of rear cover 6 corresponding to retreating portion 5a with a white paint. If the portion of the inner surface of rear cover 6 is coated with a white paint, the same yields a reflectivity substantially equivalent to that of reflective sheet 5 to overcome possible uneven reflection.

SECOND EMBODIMENT

Illumination unit UT in accordance with a second embodiment of the invention is provided with a plurality of pieces divided from a reflective sheet 5 to maintain a clearance between rear cover 6 and reflective sheets 5. Since an LCD device in which illumination unit UT is assembled and an assembled structure of illumination unit UT are substantially the same as those of the first embodiment, their description is omitted.

Figure 5:
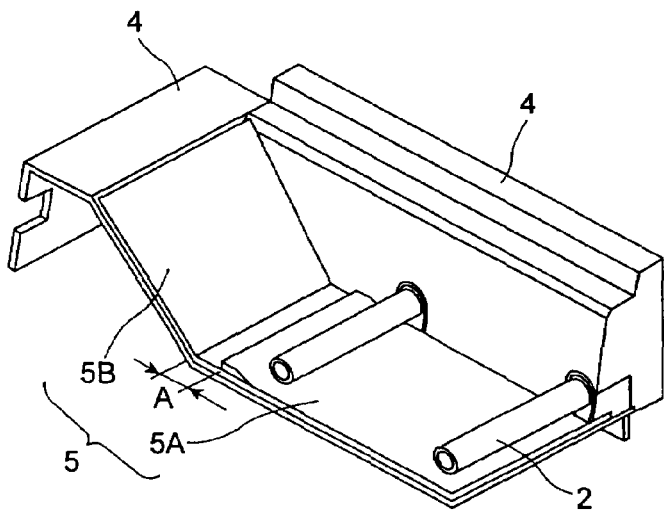
FIG. 5 is a schematic perspective view of portions of an illumination unit in accordance with a second embodiment of the present invention.
Figure 6:
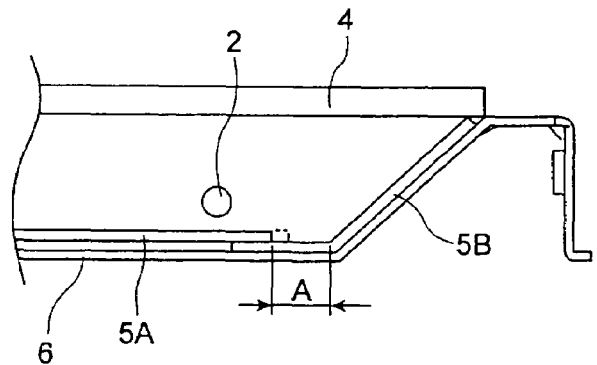
FIG. 6 is a schematic sectional view of the portions of the illumination unit shown in FIG. 5.

The structure of illumination unit UT according to the second embodiment is shown in FIGS. 5 and 6. Similarly to the basic structure of illumination unit UT of the first embodiment, illumination unit UT of this embodiment also includes light sources 2, supporting member 4 to support light sources 2, reflective sheet 5 provided on the rear side of light sources 2 and rear cover 6 provided on the rear side of reflective sheet 5.

In illumination unit UT of the first embodiment, retreating portion 5a of reflective sheet 5 is formed and reflective sheet 5 is smaller in size than the inner surface of rear cover 6 to define clearance "A" between reflective sheet 5 and rear cover 6. In illumination unit UT of the present embodiment, however, reflective sheet 5 is divided into a plurality of pieces to prevent reflective sheet 5 from interfering with rear cover 6.

More concretely, reflective sheet 5 is divided into two pieces 5A and 5B as shown in FIGS. 5 and 6. A divided position of reflective sheet 5 is basically arbitrary but a preferable portion is in the vicinity at which rear cover 6 is folded. A reason is that reflective sheet 5 is in contact with a rising-up wall portion of rear cover 6 at the portion where rear cover 6 is folded, so that distortions are easily caused there.

Divided pieces 5A and 5B of reflective sheet 5 are partially overlapped at the divided portion but edge portions of divided pieces 5A and 5B are open, respectively. Further, the open edge portion of piece 5A is set to be of such a size that the same does not contact with, but slightly extends back to, the rising-up edge portion of rear cover 6.

With that structure, clearance "A" is defined between reflective sheet 5 and rear cover 6. Thus, when piece 5A of reflective sheet 5 expands with heat, since the open edge portion of piece 5A is not fixed but free, the same slightly extends directing to the rising-up wall of rear cover 6 as shown by dotted lines in FIG. 6. Clearance "A", however, absorbs such extension of piece 5A and the open edge portion does not contact with the rising-up wall of rear cover 6. Similarly to the first embodiment, distortions of reflective sheet 5, if any, do not effectively cause its curves or wrinkles.

In the foregoing description, certain terms have been used for brevity, clearness and understanding, but no unnecessary limitations are to be implied therefrom beyond the requirements of the prior art, because such words are used for descriptive purposes herein and are intended to be broadly construed. Moreover, the embodiments of the improved construction illustrated and described herein are by way of example, and the scope of the invention is not limited to the exact details of construction. Having now described the invention, the construction, the operation and use of embodiments thereof, and the advantageous new and useful results obtained thereby, the new and useful construction, and reasonable equivalents thereof obvious to those skilled in the art, are set forth in the appended claims.

What is claimed is:

1. An illumination unit projecting light to a liquid crystal display panel, comprising:
   a light source;
   a reflective sheet provided to reflect light from the light source;
   a rear cover provided to cover the reflective sheet;
   a clearance provided between the reflective sheet and the rear cover to absorb thermal expansion of the reflective sheet; and
   a supporting member to support the light source with respect to the rear cover,
   wherein the reflective sheet is provided to retreat from a corner portion where the rear cover contacts the supporting member, the reflective sheet and the rear cover obliquely extend from flat portions to form oblique portions, respectively, and the oblique portion of the reflective sheet is smaller than the oblique portion of the rear cover such that an edge portion of the oblique portion in the reflective sheet is open.

2. An illumination unit according to claim 1, wherein the reflective sheet is provided to define a space with respect to the cover sheet.

3. An illumination unit according to claim 2, wherein the reflective sheet has a white inner surface.

4. A liquid crystal display device, comprising:
   the illumination unit according to claim 3; and
   a liquid crystal panel provided on a light projecting side of the illumination unit.

5. An illumination unit according to claim 1, wherein the reflective sheet has a white inner surface.

6. A liquid crystal display device, comprising:
   the illumination unit according to claim 5; and
   a liquid crystal panel provided on a light projecting side of the illumination unit.

7. A liquid crystal display device, comprising:
   the illumination unit according to claim 1; and
   a liquid crystal panel provided on a light projecting side of the illumination unit.

8. A liquid crystal display device, comprising:
   the illumination unit according to claim 2; and
   a liquid crystal panel provided on a light projecting side of the illumination unit.

* * * * *